G. EGLY.
FLAME ARC LAMP AND ELECTRODE THEREFOR.
APPLICATION FILED SEPT. 9, 1914.
1,132,313.
Patented Mar. 16, 1915
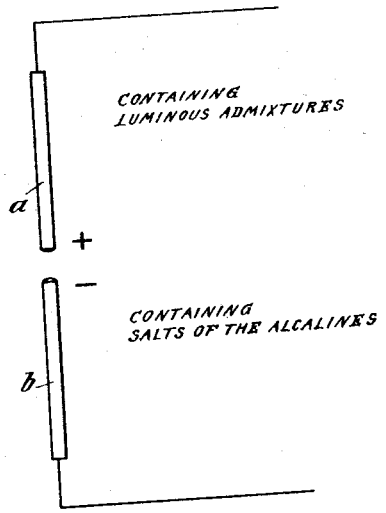
Witnesses
Elsie Swenson
Geza A. Simon
Inventor:
Georg Egly.
by
Attorney

UNITED STATES PATENT OFFICE.

GEORG EGLY, OF BERLIN-TREPTOW, GERMANY, ASSIGNOR TO GEBRÜDER SIEMENS & CO., OF BERLIN-LICHTENBERG, GERMANY, A CORPORATION OF GERMANY.

FLAME-ARC LAMP AND ELECTRODE THEREFOR.

1,132,313.     Specification of Letters Patent.     Patented Mar. 16, 1915.

Application filed September 9, 1914. Serial No. 860,874.

*To all whom it may concern:*

Be it known that I, GEORG EGLY, a German citizen, and resident of Berlin-Treptow, Germany, have invented certain new and useful Improvements in Flame - Arc Lamps and Electrodes Therefor, of which the following is a specification.

In arc lamp electrodes having mineral admixtures especially in case one electrode is mounted above the other frequently a formation of slag will take place at the negative electrode which will prevent the lamp from properly operating. This formation of slag at the negative electrode is due to the fact that particles of luminous salts of the positive electrode are carried by the arc toward the negative electrode, which particles by reason of the low temperature of the negative electrode will not be caused to evaporate but only undergo melting and deposit in the form of pearls thus being a cause for the non-ignition of the lamp. With decreasing current strength this formation of slag will come more into effect and the ordinarily employed auxiliaries for preventing the formation of slag at the electrode by admixtures of salts of the alkaline metals will not be effective.

In order to prevent the formation of slag at the negative electrode a pure or ordinary cored carbon has been employed. By this, however, the slag formation and the consequent troubles could not be avoided. According to my present invention I entirely obviate this disadvantage by embodying exclusively salts of the alkalis into the negative electrode and in even distribution throughout the mass thereof. For this purpose for instance the carbonates, borates, and so forth, may be used, that is to say potash, sodium carbonate, borax, and so forth. The alkaline salts in the electrode have the purpose to again cause the evaporation of the luminous materials which arrive from the positive electrode and deposit upon the negative electrode, before these materials unite themselves to form molten pearls.

I have incorporated my present invention in the accompanying drawing, in which $a$ designates the upper or positive, $b$ the lower or negative electrode, and in which the composition of these electrodes, as above pointed out, is indicated by proper legends.

Having thus described my invention I claim as new and desire to secure by Letters Patent of the United States:—

1. A flame arc lamp comprising in combination a negative electrode comprising as an essential ingredient a slag removing admixture in the form of alkaline salts such as carbonates, borates or the like, evenly distributed throughout the mass of said electrode, and a positive electrode containing luminous admixtures.

2. A flame arc lamp comprising in combination a negative electrode containing as an essential ingredient a slag removing admixture in the form of borates evenly distributed throughout the mass of said electrode and a positive electrode comprising luminous admixtures.

In testimony whereof I have hereunto set my signature in the presence of two subscribing witnesses.

GEORG EGLY.

Witnesses:
  HENRY HASPER,
  WOLDEMAR HAUPT.